United States Patent
Audrain

(10) Patent No.: US 6,931,506 B2
(45) Date of Patent: Aug. 16, 2005

(54) ELECTRONIC DEVICE FOR DATA PROCESSING, SUCH AS AN AUDIO PROCESSOR FOR AN AUDIO/VIDEO DECODER

(75) Inventor: Stéphane Audrain, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 315 days.

(21) Appl. No.: 10/371,400

(22) Filed: Feb. 20, 2003

(65) Prior Publication Data
US 2003/0163659 A1 Aug. 28, 2003

(30) Foreign Application Priority Data
Feb. 20, 2002 (EP) .............................. 02290409

(51) Int. Cl.⁷ .............................................. G06F 13/00
(52) U.S. Cl. ...................... 711/169; 711/167; 711/168; 713/500; 713/501; 713/600
(58) Field of Search ................................ 711/147, 150, 711/167, 168, 169; 712/31, 35; 713/400, 500, 501–502, 600; 369/47.1

(56) References Cited
U.S. PATENT DOCUMENTS 5,787,488 A * 7/1998 Garde ........................ 711/169
6,327,648 B1   12/2001 Hedayat et al. ............... 712/35
6,836,166 B2 * 12/2004 Lin et al. ..................... 327/158

FOREIGN PATENT DOCUMENTS

| EP | 0399204 | 11/1990 | ......... G06F/13/364 |
| EP | 0575229 | 12/1993 | .......... G06F/13/42 |
| EP | 0724220 | 7/1996 | ........... G06F/15/16 |
| WO | 00/70433 | 11/2000 | ............. G06F/1/32 |

\* cited by examiner

Primary Examiner—Mano Padmanabhan
Assistant Examiner—Jasmine Song
(74) Attorney, Agent, or Firm—Lisa K. Jorgenson; Allen, Dyer, Doppelt, Milbrath & Gilchrist, P.A.

(57) ABSTRACT

An electronic device for data processing may include p synchronous processor cores each respectively clocked by one of p clock signals all having a same period T and being phase-shifted by $2\pi/p$ relative to one other. The electronic device may further include a single access shared memory with an access time less than or equal to T/p. The memory may be clocked by an access signal with a period T/p and that is synchronous with the clock signals. The processors cores may sequentially and cyclically access the memory at consecutive intervals spaced apart in time with a period equal to T/p. The electronic device is particularly well suited for use in audio processors of digital versatile disk (DVD) decoders, for example.

35 Claims, 3 Drawing Sheets

ELECTRONIC DEVICE FOR DATA PROCESSING, SUCH AS AN AUDIO PROCESSOR FOR AN AUDIO/VIDEO DECODER

FIELD OF THE INVENTION

The present invention relates to digital data processing and, more specifically, to digital signal processors. The invention is particularly (though not exclusively) applicable to audio processors, for example, such as those incorporated in a digital versatile disk (DVD) decoder.

BACKGROUND OF THE INVENTION

A processor, in particular a signal processing processor, is conventionally made up of a processor core which is specifically dedicated to processing, several memories (i.e., data memories and program memories), and input/output peripherals. Such a processor is capable of processing a predetermined number of millions of instructions per second (Mips).

When the number of Mips needs to be increased for a given application, one approach is to replace the existing processor core with a more efficient core. However, this can lead to greater costs both in terms of design and software compilation. Another approach is to use multiple processors to perform processing in parallel. However, this results in a significant increase in circuit size, as the surface area of the integrated circuit is essentially doubled.

SUMMARY OF THE INVENTION

An object of the invention is to increase the number of Mips of a processor, such as an audio processor, without significantly increasing circuit size.

This and other objects, features, and advantages of the invention are provided by an electronic device for processing data which may include p synchronous processor cores respectively clocked by one of p clock signals. All of the clock signals may have a same period T and may be shifted out of phase by $2\pi/p$ relative to one another. The electronic device may further include a single access shared memory with an access time at most equal to T/p and clocked by an access signal with a period T/p and that is synchronous with the clock signals. The p processor cores are thus capable of sequentially and cyclically accessing the memory at consecutive intervals spaced apart in time with a period equal to T/p.

In other words, in accordance with the present invention synchronous processor cores may share the same memory and, in particular, the same data memory. Additionally, the phase shift of the clock signals respectively clocking the processor cores may simplify data exchange and the processing control between the different processor cores.

Each processor core may have a pipelined architecture, for example. Additionally, the shared memory may include a plurality of distinct memories, such as a program memory and a data memory, for example. Furthermore, one of the processor cores may be a master core, and the remaining cores may be slave cores. As such, the device may further include enabling means or circuitry controlled by the master core for enabling or disabling the clock signal associated with each slave core. By way of example, the clock signal associated with each slave core may be a control clock signal (i.e., a gated clock), as will be appreciated by those of skill in the art.

The shared memory may further include an area for storing instructions for at least one of the slave cores. These instructions may be written to the memory area by the master core and read from the memory area by the at least one slave core. Thus, not only does the invention provide for an increase in the number of Mips with a minimal increase of the silicon surface area, but it also allows better control of current consumption, as the slave cores may be enabled or disabled by the master core if need be.

The processor cores may be signal processing cores, and the number p of core processors may be two, for example. Furthermore, the electronic device may also include a generator for generating the access signal clocking the shared memory and a divide-by-two circuit connected to the output of the generator. The output of the divide-by-two circuit may be connected to the clock input of one of the processor cores, and to the clock input of the other processor core via an inverter. As such, the both processor cores may be clocked by two clock signals with the same period T, and the shared memory may be accessed within the period T at a period equal to T/2. Both processor cores may be synchronous, and the clock of the second processor core may be inverted with respect to the clock of the first processor core.

Such an embodiment with two processor cores is particularly advantageous in that it allows the electronic device to receive successive data blocks and perform two distinct processing operations on these data blocks. Indeed, in this case, one of the cores may advantageously be dedicated to the first processing operation, and the other core may be dedicated to the second processing operation.

This may be especially beneficial when the two processor cores are used in an audio processor to perform a decoding operation (e.g., a decompression operation) followed by a post-processing operation, which may include a filtering operation, for example. Thus, the decoding operation may advantageously be dedicated to the master core, while the post-processing operation may be dedicated to the slave core.

An audio/video decoder, such as for a DVD disk device, is also provided in accordance with the present invention and may include an electronic device as briefly described above.

BRIEF DESCRIPTION OF THE DRAWINGS

Other advantages and features of the invention will become more apparent upon examining the following detailed description of embodiments thereof, given by way of non-limiting example, and the appended drawings, in which.

DETAILED DESCRIPTION OF THE PREFERRED EMBODIMENTS

Figure 1:
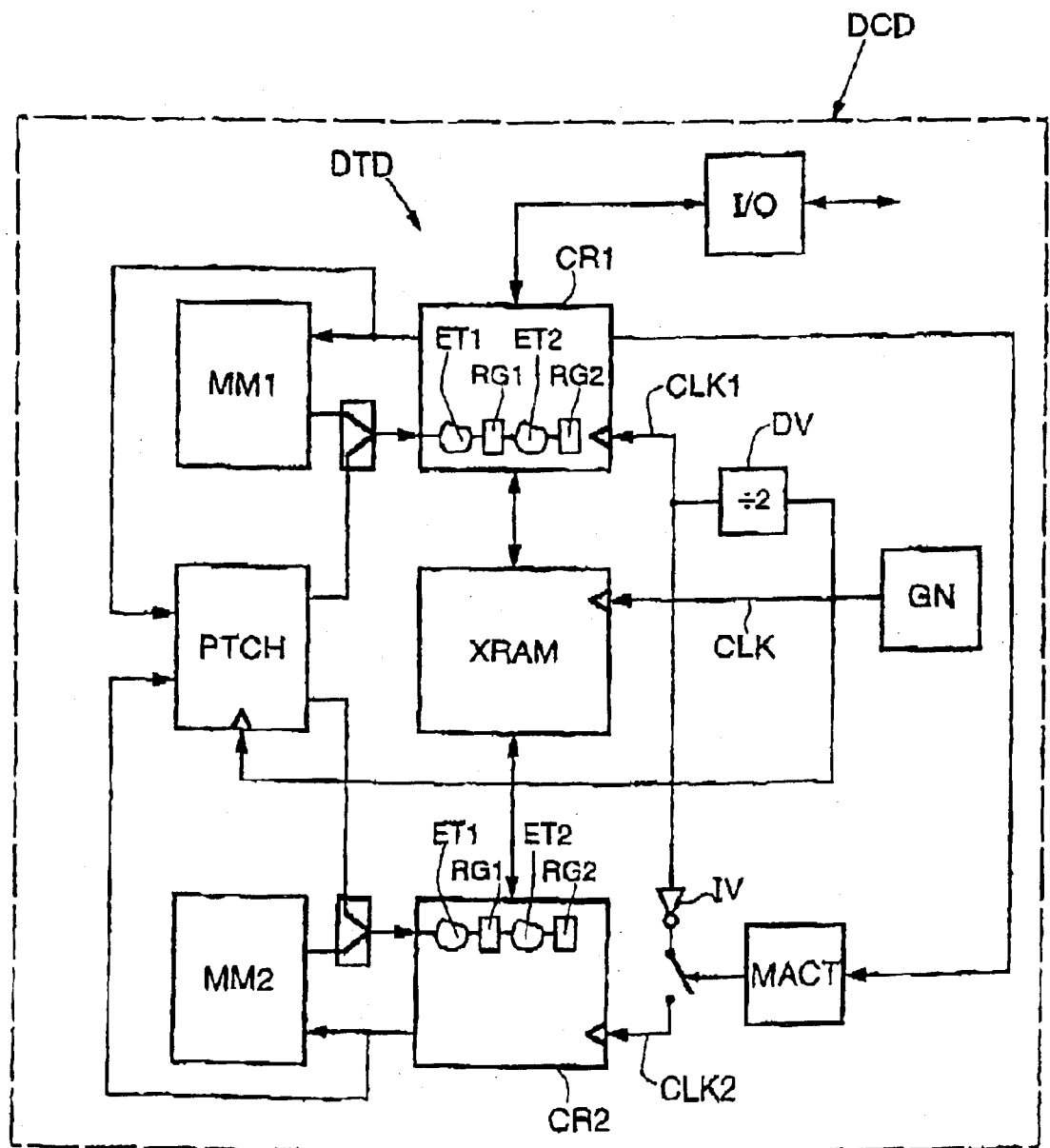
FIG. 1 is a schematic block diagram illustrating an electronic device according to the invention.

Turning now to FIG. 1, a data processing device DTD in accordance with the invention is first described. In the illustrated example, the data processing device DTD is an audio processor that may be incorporated into an audio/video decoder DCD, in particular for DVD disks, i.e., multifunctional video disks. The audio processor DTD includes two identical processor cores CR1 and CR2 for processing audio signals.

Each processor core CR1, CR2 preferably has a pipelined architecture. More specifically, the processor cores CR1, CR2 each include two processing stages ET1, ET2 and two register levels, RG1, RG2 which are clocked by respective first and second clock signals CLK1, CLK2. The second clock signal CLK2 is inverted, i.e., phase-shifted by $\pi$, with respect to the first clock signal CLK1.

In the illustrated example, the second processor core CR2 is a slave core which is controlled by the master core CR1. To illustrate this point, a switch enabled by enabling means or circuitry MACT, which is controlled by the processor core CR1, is illustratively shown after the inverter IV. The enabling means MACT is also capable of enabling or disabling the clock signal CLK2, and therefore enabling or disabling operation of the processor core CR2.

By way of example, the clock signal CLK2 may be a controlled clock signal (i.e., a gated clock signal), as will be appreciated by those skilled in the art. The enabling means MACT and the switch may thus be produced in a conventional manner by a system with logic gates, as will also be appreciated by those skilled in the art.

The audio processor DTD also includes a simple access shared memory XRAM, which is a data memory. In fact, this XRAM memory may itself be divided into two memories, i.e., an actual data memory and a coefficient memory. This being the case, both of these memories are accessed simultaneously, although only a single XRAM block is shown in FIG. 1 for clarity of illustration.

The data memory XRAM is clocked by an access signal CLK, which has a frequency double that of the clock signals CLK1 and CLK2. Thus, the clock signal CLK may be generated by a generator GN which, for example, may include a quartz. The signal CLK frequency may be equal to 166 MHz, for example. The clock signals CLK1 and CLK2 are provided at the output of a divide-by-two circuit DV connected to the output of the generator GN. The frequency of both clock signals CLK1 and CLK2 is thus 83 MHz.

In addition to the data memory XRAM, each processor core includes a respective program memory MM1, MM2, which is a read-only memory (ROM), for example. Another program memory PTCH is also provided which, for example, may be a single access RAM memory that is shared between both processor cores CR1 and CR2. With such a memory PTCH, which is also known as a "patch" memory, corrections or changes in the program written in the read-only memories MM1 and MM2 may be carried out.

In this respect, a respective duplexer is provided between the output of the program memories MM1 and MM2 and the output of the memory PTCH. Responsive to command logic (not shown in the illustrated example for clarity of illustration), the duplexers respectively select the instructions from the memories MM1, MM2 or from the memory PTCH. The audio processor DTD further includes input/output (I/O) peripherals for receiving successive audio data blocks, which are connected to the master processor core CR1, for example.

Figure 2:
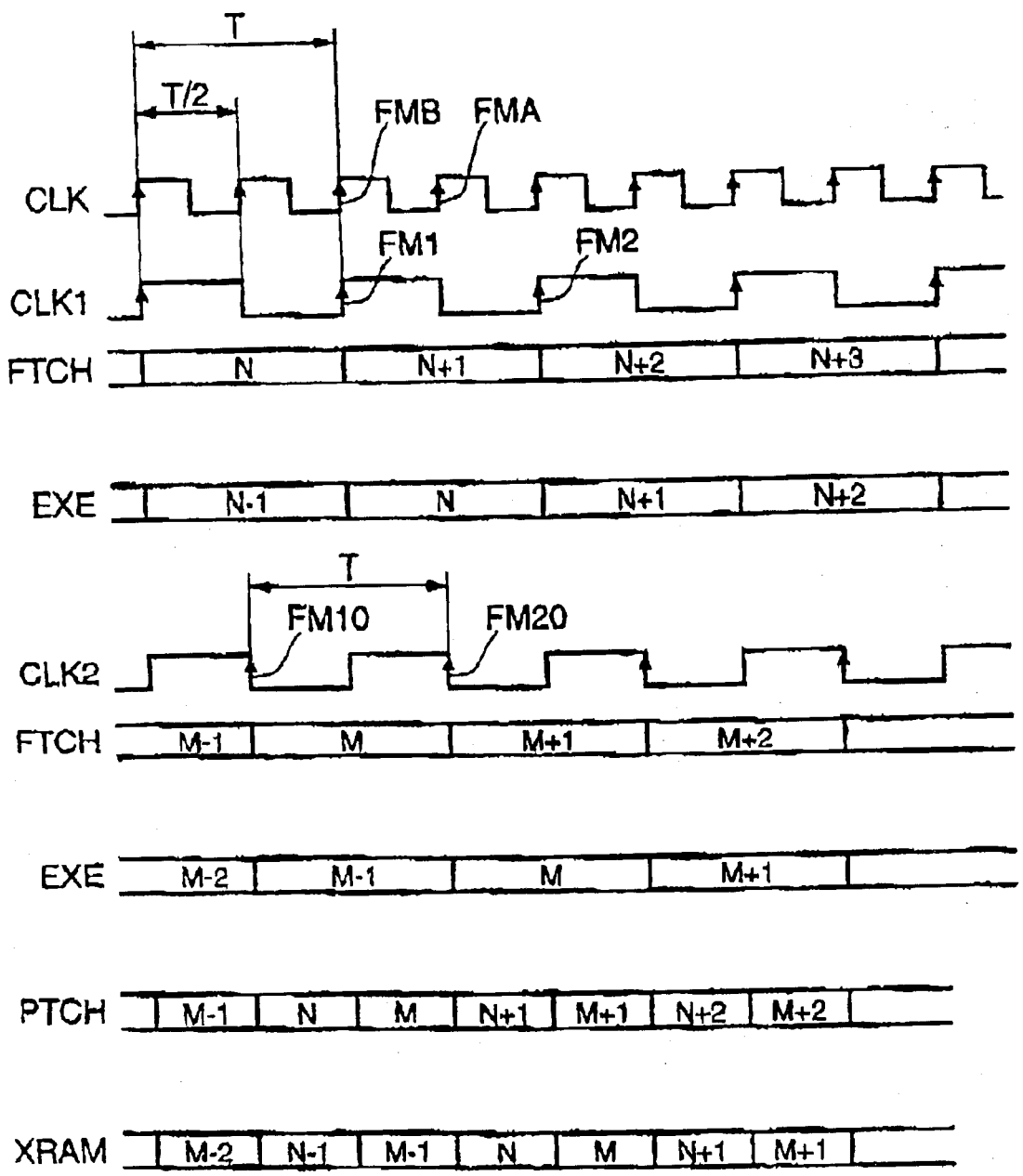
FIG. 2 is a timing diagram including timing signals for the electronic device of FIG. 1.

Referring now more particularly to FIG. 2, operation of the audio processor DTD will now be described in greater detail. The access signal CLK is associated with the shared memory, which includes the XRAM memory and the PTCH memory. The clock signal CLK has a period equal to T/2, where T refers to the period of the first clock signal CLK1 and the second clock signal CLK2. In the illustrated example, access to the memory PTCH or to the memory XRAM is carried out on the rising edges of the access signal CLK. The time for accessing the XRAM memory and the PTCH memory is at most equal to T/2. Both clock signals CLK1 and CLK2 are phase-shifted by 180°, i.e., they are usually inverted.

The signal FTCH for each processor core indicates the loading operation (FETCH) of various instructions from the program memory in the registers of the respective processor core. More specifically, the instruction N, for example, is extracted from the memory PTCH by the processing stage ET1 during a given cycle of the CLK1 clock signal and will be stored in the RG2 register upon the next rising edge FM1. The EXE signal indicates the operation for executing instructions which have been stored in the RG1 register. This execution is performed by the processing stage ET2.

Considering the pipelined architecture of the processing cores, there is a shift of one cycle between the loading of each instruction and its execution. This one cycle shift is also found in the signals FTCH and EXE associated with the CLK2 clock signal of the processor core CR2. Here, the instructions are referenced by the letters M, as these instructions are not necessarily the same as the instructions processed by the processor core CR1.

Accessing of the memories PTCH and XRAM by the cores of processors CR1 and CR2 will now be described in more detail. Accesses to the memories PTCH and XRAM associated with the matching instructions processed by the processor cores are shown respectively by the signals PTCH and XRAM. These accesses have therefore been referenced for the sake of clarity by the same letters as those allocated to the matching instructions.

As the memory PTCH is a program memory, the successive addresses at which successive instructions for the processor cores are stored are incremented by one. Accordingly, just before the rising edge FM1 of the signal CLK1, the address at which instruction N+1 is stored is available. Therefore, as soon as the rising edge FM1 rises, the processing stage ET1 may access the memory PTCH. This is the case in the present example, in which access to the memory PTCH is performed in the second half of the cycle of the clock signal CLK1, i.e., on the rising edge FMA of the signal CLK. Indeed, the memory PTCH has an access time at most equal to T/2.

Instruction N+1 will thus be available just before the rising edge FM2 so that upon the occurrence of the rising edge FM2 it is stored in register RG1. With respect to execution of instruction N, the processing stage ET2 during the first half of the cycle of the clock signal CLK1 will determine the address at which data should be stored in the memory XRAM (or read therefrom). This is so that on the rising edge FMA of the signal CLK the memory XRAM may be accessed.

This access to the memory XRAM is therefore also performed during the second half of the clock signal CLK1 cycle. The memory PTCH will be accessed in parallel during the second half of the clock signal CLK2 cycle to extract the instruction M stored in the memory PTCH. Also, the memory XRAM will be accessed during the second half of the clock signal CLK2 cycle. Therefore, as the clock signals CLK1 and CLK2 are inverted, the processor cores CR1 and CR2 successively access the memories XRAM and PTCH during one period T.

More specifically, between the rising edges FM10 and FM1, the memory PTCH and the memory XRAM are accessed by the processor core CR1, and by the processor core CR2 between the rising edges FM1 and FM20. As this is an alternative, the memory PTCH may be accessed during each first half cycle of both clock signals CLK1 and CLK2.

In accordance with the present invention, the number of processed Mips may therefore be doubled while retaining a single shared data memory XRAM and a single shared memory PTCH. When the data is audio data requiring two successive processing operations, such as a decoding operation (e.g., decompression) and a post-processing operation (e.g., filtering), the decoding operation is performed by the processor core CR1, and the post-processing operation is performed by the processor core CR2.

Figure 3:
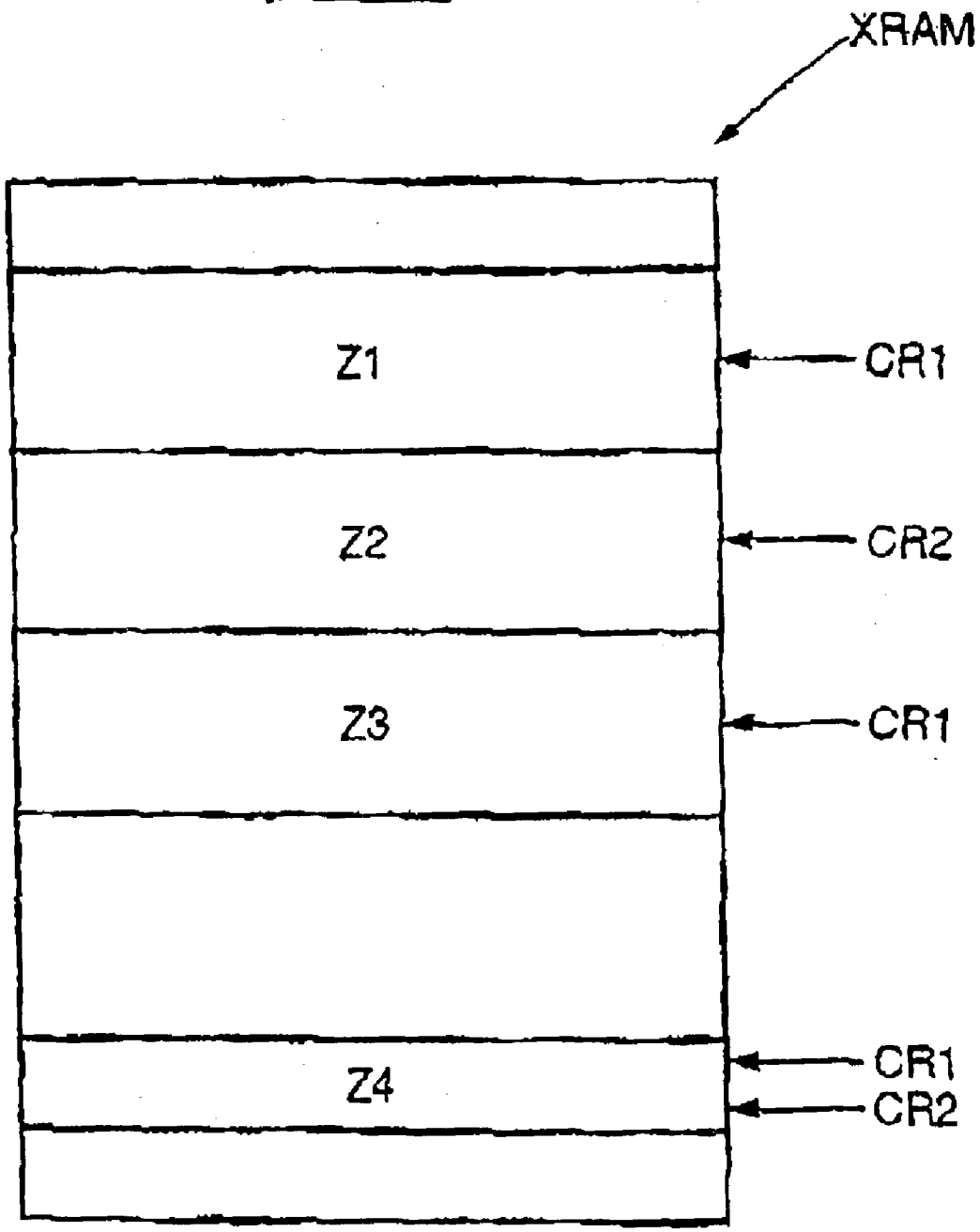
FIG. 3 is a schematic block diagram illustrating in greater detail the internal structure of the data memory shared by the processor cores of the electronic device of FIG. 1.

In this respect, the data memory XRAM includes three memory areas Z1, Z2, Z3 (FIG. 3). The memory area Z1 is a working area used by the processor core CR1 for the decoding operation. The memory area Z2 is a working area used by the processor core CR2 for post-processing. The memory area Z3 is a memory area in which data is stored after post-processing and before extraction from memory via a memory controller controlled by the processor core CR1. In addition, the memory XRAM includes a memory area Z4 for the program instructions written by the master core CR1, and which is read by the slave core CR2 when the latter is enabled by its clock signal CLK2.

That which is claimed is:

1. An electronic device comprising:
    a plurality p of synchronous processor cores each clocked by a respective clock signal, the clock signals having a same period T and being phase-shifted by $2\pi/p$ relative to one another; and
    at least one single access memory shared by said processor cores and having an access time less than or equal to T/p, said at least one single access memory being clocked by an access signal having a period T/p and being synchronous with the clock signals;
    said plurality of synchronous processor cores for sequentially and cyclically accessing said at least one single access memory at consecutive intervals spaced apart in time and with a period of T/p.

2. The electronic device according to claim 1 wherein said processor cores comprise pipelined architectures.

3. The electronic device according to claim 1 wherein said at least one single access memory comprises a data memory and a program memory for storing program instructions.

4. The electronic device according to claim 1 wherein one of said processor cores comprises a master processor core, and wherein at least one other processor core comprises a slave processor core.

5. The electronic device according to claim 4 further comprising enabling means controlled by said master processor core for enabling and disabling the clock signal associated with said at least one slave processor core.

6. The electronic device according to claim 5 wherein said at least one single access memory stores instructions for said at least one slave processor core.

7. The electronic device according to claim 1 wherein said processor cores are for processing audio signals.

8. The electronic device according to claim 1 wherein said plurality of processor cores comprises first and second processor cores, and wherein said first and second processor cores each has a clock input for receiving respective clock signals.

9. The electronic device according to claim 8 further comprising:
    a generator for generating the access signal and providing the access signal at an output thereof;
    a divider connected to the output of said generator for dividing the access signal, said divider having an output connected to the clock input of said first processor core; and
    an inverter connecting the output of said divider to the clock input of said second processor core.

10. The electronic device according to claim 9 wherein said divider divides the access signal by a factor of two.

11. The electronic device according to claim 1 wherein each processor core performs a respective processing operation.

12. The electronic device according to claim 11 wherein one of the processing operations comprises a decoding operation, and another one of the processing operations comprises a filtering operation.

13. The electronic device according to claim 1 wherein said processor cores and said at least one single access memory are implemented: in an integrated circuit.

14. An electronic device comprising:
    a plurality p of processor cores each clocked by a respective clock signal, the clock signals having a same period T and being phase-shifted by $2\pi/p$ relative to one another; and
    at least one memory shared by said processor cores and having an access time less than or equal to T/p, said at least one memory being clocked by an access signal having a period T/p and being synchronous with the clock signals;
    said plurality of processor cores for sequentially and cyclically accessing said at least one memory at consecutive intervals spaced apart in time and with a period of T/p.

15. The electronic device according to claim 14 wherein said processor cores comprise pipelined architectures.

16. The electronic device according to claim 14 wherein said at least one memory comprises a data memory and a program memory for storing program instructions.

17. The electronic device according to claim 14 wherein one of said processor cores comprises a master processor core, and wherein at least one other processor core comprises a slave processor core.

18. The electronic device according to claim 17 further comprising an enabling circuit controlled by said master processor core for enabling and disabling the clock signal associated with said at least one slave processor core.

19. The electronic device according, to claim 14 wherein said plurality of processor cores comprises first and second processor cores, and wherein said first and second processor cores each has a clock input for receiving respective clock signals.

20. The electronic device according to claim 19 further comprising:
    a generator for generating the access signal and providing the access signal at an output thereof;
    a divider connected to the output of said generator for dividing the access signal, said divider having an output connected to the clock input of said first processor core; and
    an inverter connecting the output of said divider to the clock input of said second processor core.

21. The electronic device according to claim 14 wherein each processor core performs a respective processing operation; and wherein one of the processing operations comprises a decoding operation, and another one of the processing operations comprises a filtering operation.

22. A digital versatile disk (DVD) device comprising:
    a DVD reader; and
    a decoder for processing signals generated by the DVD reader upon reading a DVD, said decoder comprising a plurality p of processor cores for processing the signals and each clocked by a respective clock signal, the clock signals having a same period T and being phase-shifted by 2π/p relative to one another, and at least one memory shared by said processor cores and having an access time less than or equal to T/p, said at least one memory being clocked by an access signal having a period T/p and being synchronous with the clock signals, said plurality of processor cores for sequentially and cyclically accessing said at least one memory at consecutive intervals spaced apart in time and with a period of T/p.

23. The DVD device according to claim 22 wherein said processor cores comprise pipelined architectures.

24. The DVD device according to claim 22 wherein said at least one memory comprises a data memory and a program memory for storing program instructions.

25. The DVD device according to claim 22 wherein one of said processor cores comprises a master processor core, and wherein at least one other processor core comprises a slave processor core.

26. The DVD device according to claim 25 wherein said decoder further comprises an enabling circuit controlled by said master processor core for enabling and disabling the clock signal associated with said at least one slave processor core.

27. The DVD device according to claim 22 wherein said plurality of processor cores comprises first and second processor cores, and wherein said first and second processor cores each has a clock input for receiving respective clock signals.

28. The DVD device according to claim 27 wherein said decoder further comprises:

a generator for generating the access signal and providing the access signal at an output thereof;

divider connected to the output of said generator for dividing the access signal, said divider having an output connected to the clock input of said first processor core; and an inverter connecting the output of said divider to the clock input of said second processor core.

29. The DVD device according to claim 22 wherein each processor core performs a respective processing operation; and wherein one of the processing operations comprises a decoding operation, and another one of the processing operations comprises a filtering operation.

30. A method for using a plurality p of processor cores and at least one memory shared by the processor cores, the method comprising:

providing a respective clock signal for each processor, the clock signals having a same period T and being phase-shifted by 2π/p relative to one another;

providing an access signal for the at least one memory having a period T/p and being synchronous with the clock signals, the at least one memory having an access time less than or equal to T/p; and sequentially and cyclically accessing the at least one memory at consecutive intervals spaced apart in time and with a period of T/p.

31. The method according to claim 30 wherein one of the processor cores comprises a master processor core, and wherein at least one other processor core comprises a slave processor core.

32. The method according to claim 30 wherein the plurality of processor cores comprises first and second processor cores, and wherein the first and second processor cores each has a clock input for receiving respective clock signals.

33. The method according to claim 32 wherein providing the clock signals further comprises dividing the access signal by a factor to provide the clock signal for the first processor core, and inverting the divided access signal to provide the clock signal for the second processor core.

34. The method of claim 33 wherein the factor is two.

35. The method according to claim 32 further comprising performing a decoding operation using the first processor core and performing a filtering operation using the second processor core.

* * * * *